INVENTORS
Donald C. Schilling
Frank G. Lohnes
John P. Broderick
BY Connolly and Hutz
ATTORNEYS

United States Patent Office 3,262,644
Patented July 26, 1966

3,262,644
FLAME SPRAYING TORCH
Donald C. Schilling, Fairview Park, Ohio, and Frank G. Lohnes, Glen Cove, and John P. Broderick, Queens, N.Y., assignors to Eutectic Welding Alloys Corporation, Flushing, N.Y., a corporation of New York
Filed Dec. 21, 1964, Ser. No. 420,025
6 Claims. (Cl. 239—85)

This application is a continuation-in-part of copending application Serial No. 286,343, filed June 7, 1963, now Patent No. 3,190,560, This invention relates to a torch for flame spraying coatings upon surfaces, and it more particularly relates to such a torch for spraying coatings from metal powders upon metal surfaces.

When injecting powders into the stream of burning gas emitted from a gas torch for coating and fusing them upon a surface, the control or metering of the quantity of powder entering the stream of gases is highly critical. It is, accordingly, essential with such torches that the powder is reliably fed into the stream of gases. Additionally, the ease of handling such a torch is also an important consideration.

An object of this invention is to provide a simple, economical and dependable torch which reliably feeds powder into its stream of gases.

Another object is to provide such a torch which is conveniently handled.

In accordance with this invention the torch includes a powder injecting section between its tip and its gas injecting assembly. The powder container is mounted at the top of powder injecting section of the torch at a backwardly inclined shallow angle from the vertical when the torch is in its inactive position. Additionally, the bottom of the powder injection section is provided with a connection for securing a support at a forwardly inclined angle substantially parallel to the powder container. Accordingly, when the torch is tilted downwardly during operation, both the container and the support are disposed vertically. As a result the center of gravity of the torch is above the support to assure a better balance of the torch and to reliably feed the powder from the container to the powder injecting section.

In an advantageous form of this invention a support retaining boss is mounted upon the bottom of the powder injecting section and is forwardly inclined substantially parallel to a powder container-connecting boss at the top of the torch. A support rod may thus be conveniently attached to the support retaining boss for mounting the torch in a stationary operating position when used with moving work pieces. Additionally, a bench rest may be secured to the support for holding the torch tip elevated when the torch is inactive or stored.

Novel features and advantages of the present invention will become apparent to one skilled in the art from a reading of the following description in conjunction with the accompanying drawings wherein similar reference characters refer to similar parts and in which.

Figure 1:
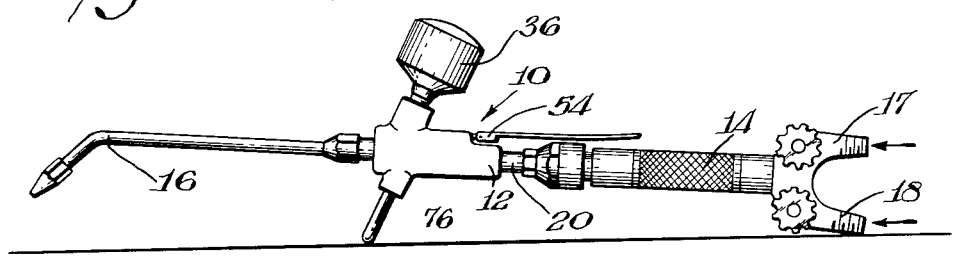
FIG. 1 is a side view in elevation of one embodiment of this invention.
Figure 2:
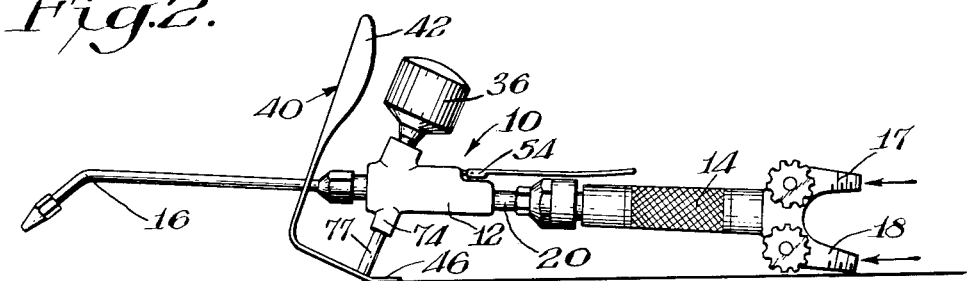
FIG. 2 is a side view in elevation of another embodiment of this invention.
Figure 3:
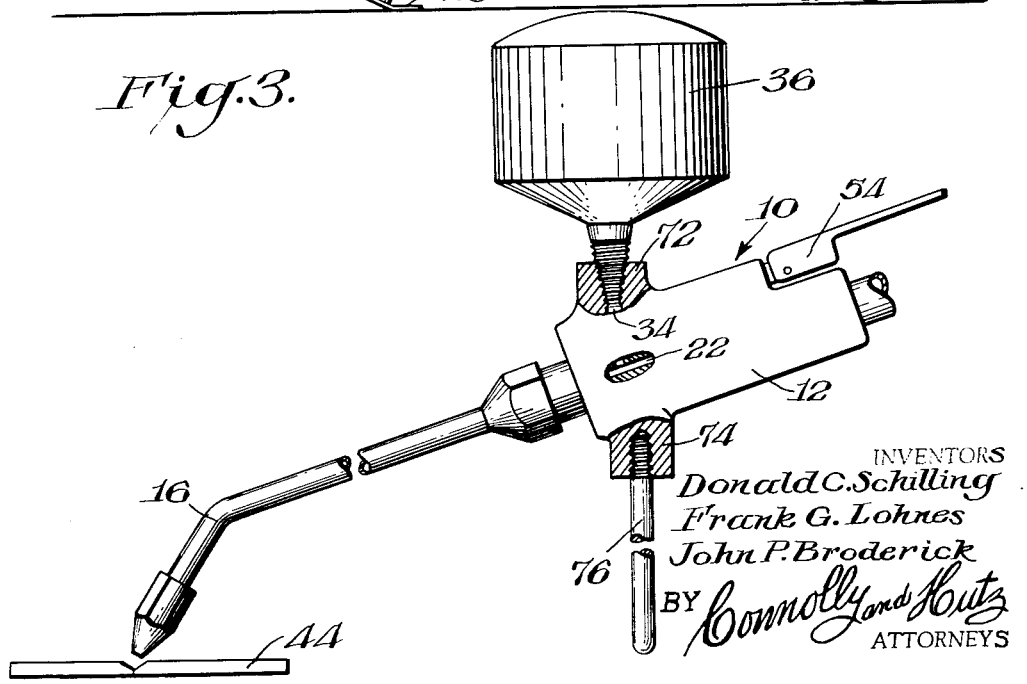
FIG. 3 is an enlarged view of a portion of the embodiment of the invention shown in FIG. 1 partially broken away and in section, during a different phase of operation.

As shown in FIGS. 1-3 flame spraying torch 10 has a powder injecting section 12 inserted between a gas injecting handle 14 and a tip section 16. Gas injecting assembly 14 is for example substantially of the standard gas welding or cutting torch type and it is for example of the oxy-acetylene variety. It includes, for example, conduit 17 for oxygen and conduit 18 for acetylene, and suitable mixing means. The nose 20 terminates in an injector nozzle (not shown) which communicates with a conduit 22 (FIG. 3) through powder injecting section 12 and with tip 16.

Powder supplying container 36 is connected to the top of conduit 22 in powder injecting section 12 by powder supplying passageway 34 as described in copending parent application S.N. 286,343, filed June 7, 1963, now Patent No. 3,190,560. The flow of powder from container 36 to conduit 22 in the injecting section 12 is controlled by a manual operating lever assembly 54.

As shown in FIG. 3 powder injecting section 12 includes an integral upper boss 72 which is substantially engaged with powder container 36. The backward inclination of upper boss 72 is at an angle of approximately 15° to the vertical (i.e. 75° from the longitudinal axis of torch 10) and maintains powder container 36 and supply passageway 34 disposed in the efficient vertical position when torch 10 is held at a slightly inclined angle during the normal operation, shown in FIG. 3 to insure flow of powder from container 36 into powder injecting section 12 when operating on workpiece 44.

As shown in FIG. 3 powder injecting section 12 includes an integral lower boss 74. Boss 74 is forwardly inclined at the same angle to the vertical as upper boss 72. The substantially parallel inclination of lower boss 74 with upper boss 72 provides a convenient mode of connecting various fixtures such as rod 76 threaded within it for maintaining the torch conveniently disposed in its most effective operating position. Thus rod 76 is easily secured to a fixture (not shown) to maintain torch 10 stationary in its operating position when work pieces 44 are moved under tip 16.

When torch 10 is moved to the operating position shown in FIG. 3 the center of gravity of torch 10 is above support rod 76 to assure a better balance and facilitate the ease of handling torch 10.

As shown in FIG. 2 lower boss 74 also provides a convenient mode of attachment to shield and stand 40. Shield and stand 40 is of the type described in commonly assigned copending application S.N. 341,231, filed January 30, 1964, now abandoned and includes a front shielding section 42 which envelopes the operator's hand during use of the torch, as well as bench rest 46. Front shielding section 42 has a central opening through which torch tip 16 projects, and shield and stand 40 is also secured to support rod 77 which in turn is threadably engaged in boss 74. Accordingly, shield and stand 40 is conveniently secured to torch 10 by means of boss 74 in such a manner that the shielding section 42 is disposed in front of and parallel to powder container 36 and the planar supporting section 46 is disposed under powder injecting assembly 12 to elevate tip 16 when torch 10 is inactive.

What is claimed is:

1. A flame spraying torch comprising a gas injecting assembly having connecting means for attachment of a source of combustible gas, a tip section disposed at the front of said torch, a powder injecting section connected between said tip section and said gas injecting assembly for entraining powder within the burning gases discharged from said torch, mounting means on the top of said powder injecting section for mounting a powder container at a backawardly inclined angle from the vertical, and support retaining means at the bottom of said powder injecting section for disposing a support substantially parallel to and adjacent said container whereby said container and said support are in a vertical position when said torch and said tip section are directed downwardly upon a surface being coated to dispose the center of gravity of said torch above said support.

2. A torch as set forth in claim 1 wherein said mounting means comprises an internally threaded backwardly inclined boss.

3. A torch as set forth in claim 1 wherein said supporting retaining means comprises an internally threaded forwardly inclined boss.

4. A torch as set forth in claim 3 including a support rod threadably engaged in said boss.

5. A torch as set forth in claim 4 wherein said mounting means comprises an internally threaded backwardly inclined boss.

6. A torch as set forth in claim 1 in combination with a powder container connected to said mounting means and a support connected to said retaining means, the center of gravity of said torch being disposed above said support when said torch is tilted and said support and said container being vertical to assure better balance of said torch and to reliably feed powder from said container.

References Cited by the Examiner

UNITED STATES PATENTS

| 2,305,269 | 12/1942 | Moreland | 239—245 |
| 2,786,779 | 3/1957 | Long et al. | 239—85 |
| 2,794,677 | 6/1957 | Collardin et al. | 239—85 |

FOREIGN PATENTS

| 730,654 | 5/1955 | Great Britain. |

EVERETT W. KIRBY, *Primary Examiner.*